Sept. 28, 1926.

B. NORDFELDT 1,601,410

PHASE AND FREQUENCY CONVERTER

Filed Jan. 11, 1923　　　2 Sheets-Sheet 1

INVENTOR:
Birger Nordfeldt
BY Wm Wallace White ATT'Y

Sept. 28, 1926.

B. NORDFELDT 1,601,410

PHASE AND FREQUENCY CONVERTER

Filed Jan. 11, 1923    2 Sheets-Sheet 2

BIRGER NORDFELDT
INVENTOR

BY Wm Wallace White
ATTORNEY

Patented Sept. 28, 1926.

1,601,410

UNITED STATES PATENT OFFICE.

BIRGER NORDFELDT, OF BLASBO, VASTERAS, SWEDEN, ASSIGNOR TO ALLMANNA SVENSKA ELEKTRISKA AKTIEBOLAGET, OF VASTERAS, SWEDEN, A SWEDISH CORPORATION.

PHASE AND FREQUENCY CONVERTER.

Application filed January 11, 1923, Serial No. 611,931, and in Sweden January 26, 1922.

My present invention relates to the conversion of polyphase current into single phase, and its principal object is to provide an arrangement which simultaneously changes the frequency of said current. The invention is based upon the principle of connecting together two voltage polygons, for instance voltage triangles, at two points, while the phase sequence of the polygons is such that in a vector diagram they will lie opposite to one another. According to the invention, such voltage polygons or other analogous thereto, are obtained from windings arranged on one machine or on mechanically connected machines.

Preferably, the two windings thus connected together, are arranged on parts of the machine or machine set which have no movement relatively to one another, i. e., either both on the stationary part or both on the rotating part, for facilitating the connection without the use of slip rings between these windings. The latter may have the same number of poles or different numbers of poles, according to the desired ratio between the two frequencies.

In order that my invention may more readily be understood, I will describe it with reference to the accompanying drawing which diagrammatically illustrate some form thereof, it being understood that the invention is not limited to these specific forms.

Figure 1:
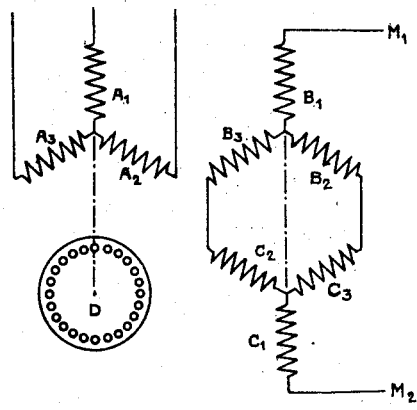
Figure 2:
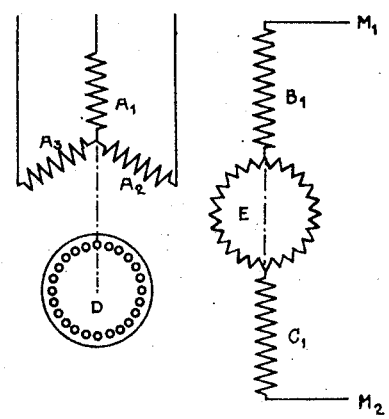
Figure 3:
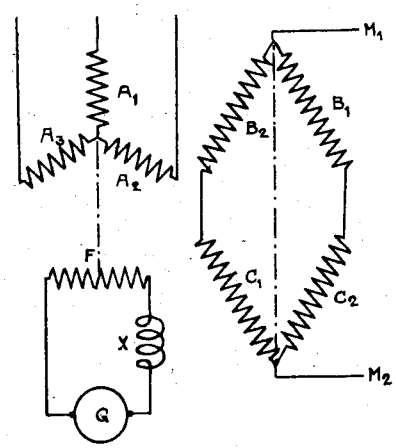
Figure 4:
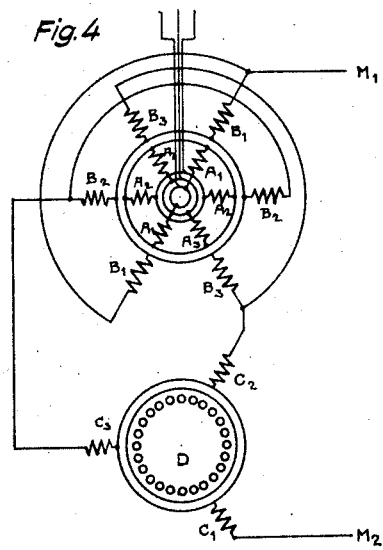
Figure 5:
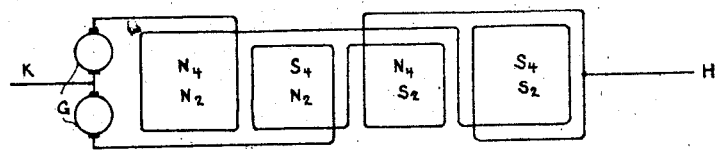
Figure 6:
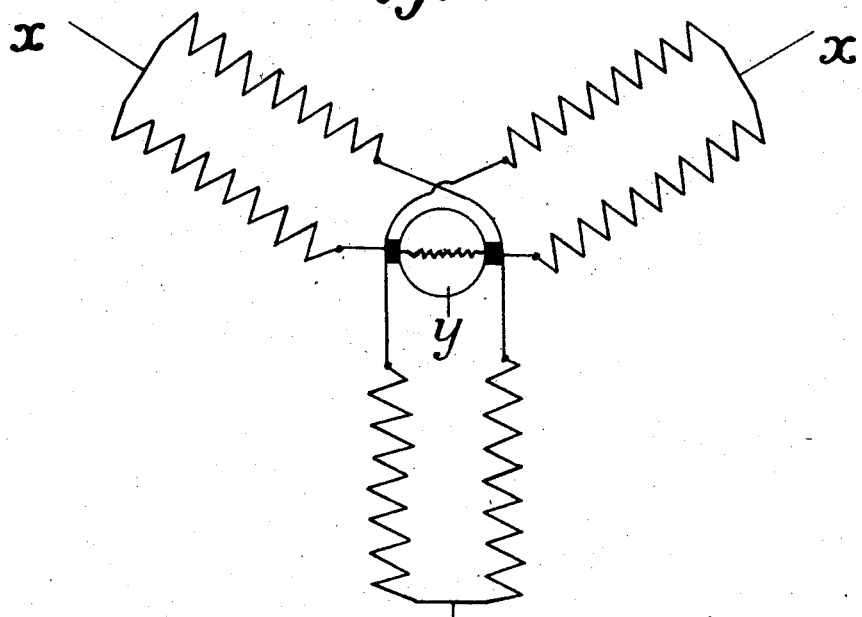
Figure 7:
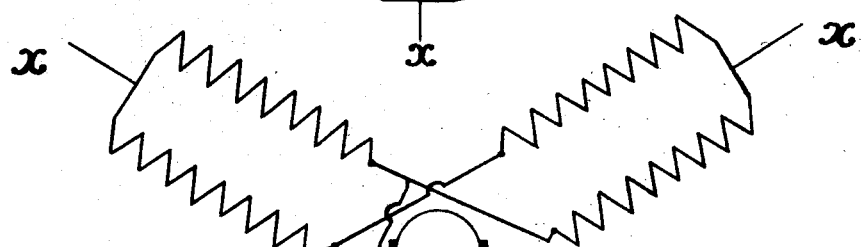

In the drawing, Figure 1 is a general diagram of an arrangement according to my invention, without reference to the number of poles of the different windings. Figures 2 and 3 show, modified forms of the same diagram. Figure 4 shows a diagram of a machine or machine set, arranged for converting three-phase current into single phase, having a frequency equal to one third of that of the three-phase current. Figure 5 shows a detail of a winding intended to carry current of two different frequencies, or alternating and direct current, adapted to be used in connection with one modified form of my invention. Figures 6 and 7 show a special arrangement of primary windings adapted for use in one modification of my invention.

Referring to Figure 1, $A_1$, $A_2$, $A_3$ are the phases of a primary three-phase winding, which may be stationary or rotating. $B_1$, $B_2$, $B_3$ is a corresponding secondary winding, which is magnetically interlinked with and has the same number of poles as $A_1$, $A_2$, $A_3$ and is rotatable if the former is stationary, or vice versa. Mechanically attached to the secondary winding, that is, either on the same core or on a core mechanically connected thereto, is another three-phase winding $C_1$, $C_2$, $C_3$ which is electrically connected to $B_1$, $B_2$, $B_3$ at two terminals, observing an opposite phase sequence in the two windings, that is, if the voltage in the B winding attains its maximum values in the order $B_1$, $B_2$, $B_3$, and in the C winding in the order $C_1$, $C_2$, $C_3$, $B_3$ should be connected to $C_2$ and $B_2$ to $C_3$. Under this condition, although rotating fluxes will traverse both windings and create three-phase voltages therein, the voltage between the two free terminals $M_1$ and $M_2$ of B, and C, will be a single-phase voltage equal to three times the phase voltage.

The C winding—which may be termed the tertiary winding—acts upon a fourth winding D, which is mechanically attached to the A winding and may be called the quaternary winding. In Figure 1, it is supposed to be a short-circuited winding.

If the A and B windings are of one pole number and the C and D windings of another, or if the A and B windings are on one pair of magnetically interlinked cores and the C and D windings on another, the two rotating fields will be independent of one another. If they are of the same number of poles, and on the same core, special precautions must generally be taken to prevent them from disturbing each other, as more fully explained hereinafter.

The manner of operation of this system of windings can now be explained. As the winding D is short-circuited, it can have no great speed relatively to the flux traversing it. Thus, if it has the same number of poles as the A winding, it cannot be placed on the same core, but if it has another number of poles, it may be short-circuited for this number but act as an open winding for the number of poles of the A winding and thus be on the same core. If it is a symmetrical squirrel cage winding, it has no definite number of poles and thus should generally not be placed on the same core as A.

The core of winding D, in any case, has but a small slip relatively to the field of C, and if properly dimensioned, can be regarded, for the purpose of simplicity, as synchronous therewith. If the number of poles C is designated by $p_2$, and the speed of the portion B—C with respect to A—D by $n$, counted in revs./minute, the frequency in the C winding will be $$\frac{np_2}{120}.$$

On the other hand, if the original frequency is $c$ and the number of poles of A or B is $p$, the frequency in B will be $$c - \frac{np_1}{120}.$$

As the electrical connection between B and C necessitates equality between these two frequencies, $n$ will be determined by the equation—

$$\frac{np_2}{120} = c - \frac{np_1}{120};$$

$$n = \frac{120c}{p_1 + p_2}$$

and the single phase frequency $$\frac{np_2}{120} \text{ will be} = \frac{p_1}{p_1 + p_2} c.$$

If, for instance, the numbers $p_1$ and $p_2$ are equal, the single phase frequency will be half that of the three-phase, and if $P_2$ is twice as large as $p_1$, it will be one third.

In Figure 1, the single phase current, which is to be generated by the machine, passes through B, then divides between $B_3$—$C_2$ and $B_2$—$C_3$, and flows together through $C_1$. Further a current circulated through $B_3$—$B_2$—$C_3$—$C_2$. As the latter current principally serves to keep the two systems B and C in mutual synchronism, it is not necessary that the windings $B_2$ $B_3$ and $C_2$ $C_3$ be of corresponding number of turns to $B_1$ and $C_1$ respectively, or symmetrically arranged with respect thereto. Thus for instance, the windings $B_3$—$B_2$—$C_3$—$C_2$ may be replaced by a closed symmetrical winding E, as shown in Figure 2, if this is found appropriate for mechanical reasons.

Instead of making the windings B and C star-connected, either or both thereof may be delta-connected or in open delta (V-connection), as shown in Figure 3. In this figure, there is also shown, instead of a short circuited winding D, an exciting winding F adapted to be fed by direct current from a small generator G. In this case, the whole set will run at exact synchronism.

Such an exciting winding F may be of the same number of poles as the winding A and still placed on the same core, if a sufficient reactance is introduced in the exciter circuit for preventing an appreciable amount of alternating current therethrough. Such a reactance is shown at X.

Common to all these figures is that the voltages of the secondary and the tertiary windings together form a voltage diagram, which has one longer axis between which the single phase current is tapped at $M_1$ $M_2$, and one closed loop for a current to circulate to keep the windings in mutual synchronism.

Figure 4 serves to illustrate more particularly, but still diagrammatically, a form where the numbers of poles are different in the two halves of the machines, namely, four in the primary and secondary part and two in the tertiary and quaternary part. In this form, the three phase current is introduced on the rotor of a four-pole machine and passes through the phase windings $A_1$ $A_2$ $A_3$, each divided into two parallel paths. This rotor will run at approximately $\tfrac{2}{3}$ of its synchronous speed and generate in the stator windings $B_1$ $B_2$ $B_3$ a voltage of $\tfrac{1}{3}$ of the original frequency. It will be noted, that as the motor will rotate inversely to the spacial phase sequence of its windings, the sequence of the stator windings in space will be opposite to the direction of rotation. This should be observed in making the connections to the other stationary (tertiary) winding $C_1$ $C_2$ $C_3$, as shown in the drawing. The quaternary winding D, is here shown as a short circuited winding.

Figure 5 shows an arrangement for the case where the primary and quaternary windings are combined in a single winding placed on the one magnetic core and suitable for two different numbers of poles, serving as one phase of an alternating current winding for the four-pole arrangement and as a D. C. exciting or phase compensating winding for the two-pole arrangement. G represents the exciter armature winding, or the winding of some phase-compensating device, as a Kapp vibrator, while the letters N S designate the polarities and the indices attached thereto the corresponding number of poles. It will be seen that while for the direct current the two-pole winding is connected in series and energize the two-poles alternatively as $N_2$ $S_2$ the same winding for the alternating current, which enters at H and leaves at K, at the middle of the exciter winding, the winding will be a four-pole winding divided in two parallel paths. The pitch of the winding can easily be chosen so as to give an appropriate shape of the field curve.

In three-phase primary windings, when used as quaternary windings with compensating current, the latter should preferably be introduced at the neutral point of the star-connected winding.

This will be understood by reference to the diagrams Figures 6 and 7 representing respectively modes of introducing the magnetizing or compensating voltage at the neutral point of the machine. Figure 6 illustrates a parallel connection and Figure 7 a series connection. $x$ indicates the three-phase terminals and $y$ the exciter, or phase compensator.

The arrangement described can also be used for converting single-phase current into polyphase, and can in any case also deliver mechanical energy, if desired.

I claim as my invention:—

1. A phase and frequency converter comprising a primary polyphase winding, a secondary polyphase winding movable relatively thereto, a tertiary polyphase winding electrically connected to said secondary winding, so as to form therewith an aggregate of phase windings the geometrical voltage diagram of which has a longer and a shorter axis and forms a closed loop embracing both windings, single phase taps, at the ends of said maximum axis, and means for fixing the speed of the flux of said tertiary winding with respect to said primary winding.

2. A phase and frequency converter comprising a primary polyphase winding, a secondary polyphase winding magnetically interlinked therewith and mechanically movable with respect thereto, a tertiary polyphase winding electrically connected with said secondary winding at two points only, but mutually non-inductive means for tapping single phase current between one terminal of said secondary and one terminal of said tertiary winding, and a quaternary winding magnetically interlinked with said tertiary winding and mechanically determined to fix the speed of its flux with respect to said primary winding.

3. A phase and frequency converter comprising a primary polyphase winding, a secondary winding magnetically interlinked therewith and mechanically movable with respect thereto, a tertiary winding having another number of poles than said secondary winding at two points only electrically connected thereto, means for tapping single phase current between one terminal of said secondary and one terminal of said tertiary winding, and means for fixing the speed of the flux of said tertiary winding with respect to said primary winding.

4. A phase and frequency converter comprising a primary polyphase winding, a secondary winding magnetically interlinked therewith and movable with respect thereto, and a tertiary winding electrically connected to said secondary winding at two points only and mechanically stationary relatively thereto, said primary winding being provided with special taps to act as a quaternary winding for keeping the flux of the tertiary winding practically stationary thereto.

In testimony whereof I have signed my name to this specification.

BIRGER NORDFELDT.